(12) United States Patent
Shen

(10) Patent No.: US 11,570,794 B2
(45) Date of Patent: *Jan. 31, 2023

(54) METHOD, TERMINAL DEVICE AND NETWORK DEVICE FOR TRANSMITTING CHANNELS

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 17 days.

This patent is subject to a terminal disclaimer.

(21) Appl. No.: 17/240,526

(22) Filed: Apr. 26, 2021

(65) Prior Publication Data

US 2021/0250965 A1  Aug. 12, 2021

Related U.S. Application Data

(63) Continuation of application No. 16/927,485, filed on Jul. 13, 2020, now Pat. No. 11,019,643, which is a
(Continued)

(51) Int. Cl.
*H04W 72/12* (2009.01)
*H04L 5/00* (2006.01)
(Continued)

(52) U.S. Cl.
CPC ..... *H04W 72/1257* (2013.01); *H04W 72/042* (2013.01); *H04W 72/0446* (2013.01); *H04W 72/1263* (2013.01); *H04W 76/27* (2018.02)

(58) Field of Classification Search
None
See application file for complete search history.

(56) References Cited

U.S. PATENT DOCUMENTS 10,771,212 B2   9/2020  Ko et al.
10,880,921 B2 * 12/2020  Babaei ............... H04W 74/006
(Continued)

FOREIGN PATENT DOCUMENTS

CN   105722229 A   6/2016
CN   106712921 A   5/2017
(Continued)

OTHER PUBLICATIONS

International Search Report(ISR) dated Oct. 15, 2018 for Application No. PCT/CN2018/072478.
(Continued)

*Primary Examiner* — Ajit Patel
(74) *Attorney, Agent, or Firm* — Ladas & Parry LLP

(57) ABSTRACT

Method, terminal device and network device for transmitting channels are provided. The method includes: receiving at least one time domain symbol position information, where time domain symbol position information for first type is used for indicating a relative position between the starting time domain symbol occupied by the channel to be scheduled and time slot where the channel to be scheduled is located, and time domain symbol position information for second type is used for indicating a relative position between the starting time domain symbol occupied by the channel to be scheduled and time domain resources where target control information is located; determining a type of target time domain symbol position information in the at least one time domain symbol position information and then determining a position of the starting time domain symbol occupied by the channel to be scheduled and indicated by the target time domain symbol position information.

36 Claims, 6 Drawing Sheets

Related U.S. Application Data continuation of application No. PCT/CN2018/072478, filed on Jan. 12, 2018.

(51) Int. Cl.
*H04W 76/27* (2018.01)
*H04W 72/04* (2009.01)

(56) References Cited

U.S. PATENT DOCUMENTS

| | | | |
|---|---|---|---|
| 2014/0321399 | A1 | 10/2014 | Liu et al. |
| 2017/0019915 | A1 | 1/2017 | Nogami et al. |
| 2017/0171844 | A1 | 6/2017 | Suzuki et al. |
| 2018/0198650 | A1* | 7/2018 | Nogami ............ H04W 72/1273 |
| 2019/0007960 | A1 | 1/2019 | Fu et al. |
| 2019/0104006 | A1 | 4/2019 | Wang et al. |
| 2019/0320463 | A1 | 10/2019 | Yamada et al. |
| 2020/0008241 | A1 | 1/2020 | Zhou |

FOREIGN PATENT DOCUMENTS

| | | |
|---|---|---|
| CN | 106998569 A | 8/2017 |
| CN | 107113878 A | 8/2017 |
| CN | 107295660 A | 10/2017 |
| KR | 20130054105 A | 5/2013 |
| WO | 2008069936 A1 | 6/2009 |
| WO | 2017079243 A1 | 5/2017 |

OTHER PUBLICATIONS

The First Office Action of corresponding Chinese application No. 201880037043.3, dated Apr. 29, 2020.
The EESR of corresponding European application No. 18900246.2, dated Nov. 20, 2020.
The first Office Action of corresponding European application No. 18900246.2, dated Dec. 2, 2020.
The Notice of allowance of corresponding Chinese application No. 201880037043.3, dated Jul. 22, 2020.
The first Office Action of corresponding U.S. Appl. No. 16/927,485, dated Sep. 14, 2020.
The Notice of allowance of corresponding U.S. Appl. No. 16/927,485, dated Jan. 26, 2021.
ETRI:"Discussion on PDSCH start symbol indication", 3GPP Draft; R1-1713814, vol. RAN WG1, No. Prague, P. R. Czechia; Aug. 21, 2017-Aug. 25, 2017 Aug. 20, 2017(Aug. 20, 2017), XP051316612.
Guangdong Oppo Mobile Telecom: "Time-domain resource allocation for NR", 3GPP Draft; R1-1713263, vol. RAN WG1, No. Prague, Czech Republic; Aug. 21, 2017-Aug. 25, 2017 Aug. 20, 2017(Aug. 20, 2017), XP051316070.
Ericsson, TSG-RAN WG1 #91 R1-1721354; Summary of 7.3.3.1 (resource allocation), Reno, NV, US, Nov. 27-Dec. 1, 2017.
The first Office Action of corresponding Canadian application No. 3088211, dated Aug. 4, 2021.
The first Office Action of corresponding Chinese application No. 202011075508.X, dated Apr. 13, 2022.
The first Office Action of corresponding Indian application No. 202017034652, dated Nov. 30, 2021.
The first Office Action of corresponding Japanese application No. 2020-538827, dated Nov. 30, 2021.
Oppo,Resource allocation for PDSCH/PUSCH[online],3GPP TSG RAN WG1 #90b R1, Section 3, Section : 1718048,Internet<URL:http://www.3gpp.org/ftp/tsg_ran/WG1_RL1/TSGR1_90b/Docs/R1-1718048.zip>,2017.
Oppo, Text proposal on DL/UL resource allocation[online] and 3GPP TSG RAN WG1 adhoc_NR_AH_1801 R1-1800488, Internet<URL:http://www.3gpp.org/ftp/tsg_ran/WG1_RL1/TSGR1_AH/NR_AH_1801/Docs/R1-1800488.zip>, Jan. 13, 2018.
The second Office Action of corresponding European application No. 18900246.2, dated Jan. 28, 2022.
The first Office Action of corresponding Korean application No. 10-2020-7023287, dated Oct. 27, 2022.

* cited by examiner

200

S210: Transmitting a resource configuration message to a terminal device, where the resource configuration message includes at least one time domain symbol position information, different time domain symbol position information in the at least one time domain symbol position information is used for indicating different positions of the starting time domain symbol occupied by a channel to be scheduled of the terminal device, and a type of any one in the at least one time domain symbol position information is a first type or a second type

S220: Transmitting the target control information to the terminal device, where the target control information is used for the terminal device to determine target time domain symbol position information in the at least one time domain symbol position information

S230: Transmitting the channel to be scheduled with the terminal device according to the position of the starting time domain symbol occupied by the channel to be scheduled and indicated by the target control information

FIG. 6

METHOD, TERMINAL DEVICE AND NETWORK DEVICE FOR TRANSMITTING CHANNELS

CROSS-REFERENCE TO RELATED APPLICATIONS

This application is a continuation of U.S. patent application Ser. No. 14/927,485, filed on Jul. 13, 2020, which is a continuation of International Application No. PCT/CN2018/072478 filed on Jan. 12, 2018. All of the afore-mentioned patent applications are hereby incorporated by reference in their entireties.

TECHNICAL FIELD

The present application relates to the field of communications, in particular, to a method, terminal device and network device for transmitting channels.

BACKGROUND

In the Long Term Evolution (LTE) system, the time domain position of a data channel (such as a physical downlink shared channel (PDSCH)) is in units of time slots and subframes. For example, the starting position of PDSCH is relative to the time slot/subframe where PDSCH is located, indicating in the physical control format indicator channel (PCFICH) of the subframe that PDSCH starts from the first time domain symbol of the sub frame.

However, in the New Radio (NR) system for the fifth generation (5G), in order to improve the flexibility of resource allocation and reduce the time delay, the flexibility of the time domain position of the channel is greatly improved, and the allocation will be carried out in units of symbols, so the starting symbol position of the channel needs to be indicated.

At present, as for the way to indicate the starting symbol position of the channel, the 5G research has proposed two technical solutions for indicating: the first is to indicate the starting symbol position of the channel based on the starting position of the time slot, but the scheduled channel is always located behind the downlink control channel that schedules this channel. Because it is not known in advance where the downlink control channel is located in the time slot, it is generally only to distribute possible the starting symbol positions as evenly as possible within the time slot. When the downlink control channel is located at certain positions, the scheduled channel generally selects the nearest time domain position behind it, and the position may not be proximate to the downlink control channel, thus low delay scheduling cannot be realized.

The second solution is to indicate the starting symbol position of the channel based on the position of the downlink control channel. When the downlink control channel is located at any position, the starting symbol of the scheduled channel can be configured at a position proximate to the downlink control channel. However, this solution cannot effectively schedule channels that are far away from the downlink control channel. If distance between the starting symbol of the scheduled channel and the downlink control channel exceeds 1 slot, the control overhead using such solution will increase dramatically.

SUMMARY

The present application provides a method, terminal device and network device for transmitting channels, which can make full use of limited control signaling overhead and effectively indicate the starting symbol position of a scheduled channel.

In a first aspect, a method for transmitting channels is provided, including: receiving a resource configuration message transmitted by a network device, where the resource configuration message includes at least one time domain symbol position information, different time domain symbol position information in the at least one time domain symbol position information is used for indicating different positions of a starting time domain symbol occupied by a channel to be scheduled, a type of any one in the at least one time domain symbol position information is a first type or a second type, time domain symbol position information for the first type is used for indicating a relative position between the starting time domain symbol occupied by the channel to be scheduled and a time slot where the channel to be scheduled is located, and time domain symbol position information for the second type is used for indicating a relative position between the starting time domain symbol occupied by the channel to be scheduled and time domain resources where target control information is located; determining a type of target time domain symbol position information in the at least one time domain symbol position information; determining, according to the type of the target time domain symbol position information, that a position of the starting time domain symbol occupied by the channel to be scheduled and indicated by the target time domain symbol position information is a target position; transmitting, according to the target position, the channel to be scheduled with the network device.

Therefore, in the method for transmitting channels in the embodiment of the present application, the terminal device receives at least one time domain symbol position information transmitted by the network device, and different time domain symbol position information is used for indicating different positions of the time domain symbol occupied by the channel to be scheduled; the terminal device determines target time domain symbol position information in the at least one time domain symbol position information and the type of the target time domain symbol position information, and then determines a position indicated by the target time domain symbol position information and transmits the channel to be scheduled through the position. Because types of target time domain symbol position information are different, and ways of indicating the time domain symbol position are also different, thereby realizing flexible indication of the time domain symbol position information for two types. For example, when the channel to be scheduled is closer to the downlink control channel, a relative downlink control channel can be used to indicate the starting symbol position of the channel to be scheduled, while when the channel to be scheduled is farther from the downlink control channel, a time slot starting position where a relative channel to be scheduled is located can be used to indicate the starting symbol position of the channel to be scheduled.

In this way, no matter where the downlink control channel is located in the time slot, the limited control signaling overhead can be fully utilized to effectively indicate the starting symbol position of the channel to be scheduled, thus realizing more flexible, more efficient and lower time delay data channel resource allocation.

In combination with the first aspect, in one implementation form of the first aspect, the target time domain symbol position information includes a relative position parameter; if the target time domain symbol position information is of the first type, the relative position parameter is used for indicating a relative position between the starting time domain symbol occupied by the channel to be scheduled and a starting time domain symbol of the time slot where the channel to be scheduled is located; if the target time domain symbol position information is of the second type, the relative position parameter is used for indicating a relative position between the starting time domain symbol occupied by the channel to be scheduled and the time domain resources where the target control information is located.

In combination with the first aspect and the above-recited implementation form thereof, in another implementation form of the first aspect, if the target time domain symbol position information is of the second type, the relative position parameter is used for indicating a relative position between the starting time domain symbol occupied by the channel to be scheduled and a starting time domain symbol or an ending time domain symbol of a control resource set or search space where the target control information is located.

In combination with the first aspect and the above-recited implementation form thereof, in another implementation form of the first aspect, the target time domain symbol position information includes a length parameter, where the length parameter is used for indicating a length of the time domain resources occupied by the channel to be scheduled.

In combination with the first aspect and the above-recited implementation form thereof, in another implementation form of the first aspect, before determining the type of target time domain symbol position information in the at least one time domain symbol position information, the method further includes: receiving the target control information transmitted by the network device, where the target control information is used for indicating the target time domain symbol position information; determining the target time domain symbol position information according to the target control information.

In combination with the first aspect and the above-recited implementation form thereof, in another implementation form of the first aspect, the target control information includes a type parameter, where the type parameter is used for indicating the type of the target time domain symbol position information.

In combination with the first aspect and the above-recited implementation form thereof, in another implementation form of the first aspect, the target time domain symbol position information includes a type parameter, where the type parameter is used for indicating the type of the target time domain symbol position information.

In combination with the first aspect and the above-recited implementation form thereof, in another implementation form of the first aspect, the resource configuration message includes at least one time slot-level offset parameter corresponding to the at least one time domain symbol position information, and the target time domain symbol position information corresponds to a target time slot-level offset parameter; the determining the type of the target time domain symbol position information in the at least one time domain symbol position information, includes: determining the type of the target time domain symbol position information according to the target time slot-level offset parameter.

In combination with the first aspect and the above-recited implementation form thereof, in another implementation form of the first aspect, the determining the type of the target time domain symbol position information according to the target time slot-level offset parameter, includes: determining the type of the target time domain symbol position information as the first type if the target time slot-level offset parameter is not equal to 0; or determining the type of the target time domain symbol position information as the second type if the target time slot-level offset parameter is equal to 0.

In combination with the first aspect and the above-recited implementation form thereof, in another implementation form of the first aspect, the channel to be scheduled is any one of physical uplink control channel (PUCCH), physical downlink control channel (PDCCH), physical uplink shared channel (PUSCH) and PDSCH.

In combination with the first aspect and the above-recited implementation form thereof, in another implementation form of the first aspect, the resource configuration message is radio resource control (RRC) signaling or system information.

In combination with the first aspect and the above-recited implementation form thereof, in another implementation form of the first aspect, the target control information is downlink control information (DCI) for scheduling the channel to be scheduled.

Therefore, in the method for transmitting channels in the embodiment of the present application, the terminal device receives the at least one time domain symbol position information transmitted by the network device, different time domain symbol position information is used for indicating different positions of the time domain symbol occupied by the channel to be scheduled, and the terminal device determines the target time domain symbol position information in the at least one time domain symbol position information and the type of the target time domain symbol position information, and then determines the position indicated by the target time domain symbol position information and transmits the channel to be scheduled through the position. Because types of target time domain symbol position information are different, and ways of indicating the time domain symbol position are also different, thereby realizing flexible indication of the time domain symbol position information for two types. For example, when the channel to be scheduled is closer to the downlink control channel, a relative downlink control channel can be used to indicate the starting symbol position of the channel to be scheduled, while when the channel to be scheduled is farther from the downlink control channel, a time slot starting position where a relative channel to be scheduled is located can be used to indicate the starting symbol position of the channel to be scheduled.

In this way, no matter where the downlink control channel is located in the time slot, the limited control signaling overhead can be fully utilized to effectively indicate the starting symbol position of the channel to be scheduled, thus realizing more flexible, more efficient and lower time delay data channel resource allocation.

In a second aspect, a method for transmitting channels is provided, including: transmitting a resource configuration message to a terminal device, where the resource configuration message includes at least one time domain symbol position information, different time domain symbol position information in the at least one time domain symbol position information is used for indicating different positions of a starting time domain symbol occupied by a channel to be scheduled of the terminal device, a type of any one in the at least one time domain symbol position information is a first type or a second type, where time domain symbol position information for the first type is used for indicating a relative position between the starting time domain symbol occupied by the channel to be scheduled and a time slot where the channel to be scheduled is located, and time domain symbol position information for the second type is used for indicating a relative position between the starting time domain symbol occupied by the channel to be scheduled and time domain resources where target control information is located; transmitting the target control information to the terminal device, where the target control information is used for the terminal device to determine target time domain symbol position information in the at least one time domain symbol position information; transmitting the channel to be scheduled with the terminal device according to a position of the starting time domain symbol occupied by the channel to be scheduled and indicated by the target control information.

Therefore, in the method for transmitting channels in the embodiment of the present application, the network device configures at least one time domain symbol position information for the terminal device, different time domain symbol position information is used for indicating different positions of the time domain symbol occupied by the channel to be scheduled, and transmits to the terminal device information for indicating the target time domain symbol position information in the at least one time domain symbol position information, which facilitates determination of the target time domain symbol position information by the terminal device, so as to determine the type of the target time domain symbol position information and determine the position indicated by the target time domain symbol position information, so that the channel to be scheduled is transmitted through the position with the network device. Because types of target time domain symbol position information are different, and ways of indicating the time domain symbol position are also different, thereby realizing flexible indication of the time domain symbol position information for two types. For example, when the channel to be scheduled is closer to the downlink control channel, a relative downlink control channel can be used to indicate the starting symbol position of the channel to be scheduled, while when the channel to be scheduled is farther from the downlink control channel, a time slot starting position where a relative channel to be scheduled is located can be used to indicate the starting symbol position of the channel to be scheduled.

In this way, no matter where the downlink control channel is located in the time slot, the limited control signaling overhead can be fully utilized to effectively indicate the starting symbol position of the channel to be scheduled, thus realizing more flexible, more efficient and lower time delay data channel resource allocation.

In combination with the second aspect, in one implementation form of the second aspect, the target time domain symbol position information includes a relative position parameter; if the target time domain symbol position information is of the first type, the relative position parameter is used for indicating a relative position between the starting time domain symbol occupied by the channel to be scheduled and a starting time domain symbol of the time slot where the channel to be scheduled is located; if the target time domain symbol position information is of the second type, the relative position parameter is used for indicating a relative position between the starting time domain symbol occupied by the channel to be scheduled and the time domain resources where the target control information is located.

In combination with the second aspect and the above-recited implementation form thereof, in another implementation form of the second aspect, if the target time domain symbol position information is of the second type, the relative position parameter is used for indicating a relative position between the starting time domain symbol occupied by the channel to be scheduled and a starting time domain symbol or an ending time domain symbol of a control resource set or search space where the target control information is located.

In combination with the second aspect and the above-recited implementation form thereof, in another implementation form of the second aspect, the target time domain symbol position information includes a length parameter, where the length parameter indicates a length of the time domain resources occupied by the channel to be scheduled.

In combination with the second aspect and the above-recited implementation form thereof, in another implementation form of the second aspect, the target time domain symbol position information includes a type parameter, where the type parameter is used for indicating a type of the target time domain symbol position information.

In combination with the second aspect and the above-recited implementation form thereof, in another implementation form of the second aspect, the target control information includes a type parameter, where the type parameter is used for indicating a type of the target time domain symbol position information.

In combination with the second aspect and the above-recited implementation form thereof, in another implementation form of the second aspect, the resource configuration message includes at least one time slot-level offset parameter corresponding to the at least one time domain symbol position information, the target time domain symbol position information corresponds to a target time slot-level offset parameter, and the target time slot-level offset parameter is used for indicating a type of the target time domain symbol position information.

In combination with the second aspect and the above-recited implementation form thereof, in another implementation form of the second aspect, the type of the target time domain symbol position information is the first type if the target time slot-level offset parameter is not equal to 0; or, the type of the target time domain symbol position information is the second type if the target time slot-level offset parameter is less than or equal to a preset value.

In combination with the second aspect and the above-recited implementation form thereof, in another implementation form of the second aspect, the channel to be scheduled is any one of PUCCH, PDCCH, PUSCH and PDSCH.

In combination with the second aspect and the above-recited implementation form thereof, in another implementation form of the second aspect, the resource configuration message is RRC signaling or system information.

In combination with the second aspect and the above-recited implementation form thereof, in another implementation form of the second aspect, the target control information is DCI for scheduling the channel to be scheduled.

Therefore, in the method for transmitting channels in the embodiment of the present application, the network device configures at least one time domain symbol position information for the terminal device, different time domain symbol position information is used for indicating different positions of the time domain symbol occupied by the channel to be scheduled, and transmits to the terminal device information for indicating the target time domain symbol position information in the at least one time domain symbol position information, which facilitates determination of the target time domain symbol position information by the terminal device, so as to determine the type of the target time domain symbol position information and determine the position indicated by the target time domain symbol position information, so that the channel to be scheduled is transmitted through the position with the network device. Because types of target time domain symbol position information are different, and ways of indicating the time domain symbol position are also different, thereby realizing flexible indication of the time domain symbol position information for two types. For example, when the channel to be scheduled is closer to the downlink control channel, a relative downlink control channel can be used to indicate the starting symbol position of the channel to be scheduled, while when the channel to be scheduled is farther from the downlink control channel, a time slot starting position where a relative channel to be scheduled is located can be used to indicate the starting symbol position of the channel to be scheduled.

In this way, no matter where the downlink control channel is located in the time slot, the limited control signaling overhead can be fully utilized to effectively indicate the starting symbol position of the channel to be scheduled, thus realizing more flexible, more efficient and lower time delay data channel resource allocation.

In a third aspect, a terminal device is provided for performing the method in the above-recited first aspect or any possible implementation form of the first aspect. Specifically, the terminal device includes a unit for performing the method in the above-recited first aspect or any possible implementation form of the first aspect.

In a fourth aspect, a network device is provided for performing the method in the above-recited second aspect or any possible implementation form of the second aspect. Specifically, the network device includes a unit for performing the method in the above-recited second aspect or any possible implementation form of the second aspect.

In a fifth aspect, a terminal device is provided, including a memory for storing instructions, and a processor for executing the instructions stored in the memory, and when the processor executes the instructions stored in the memory, the execution causes the processor to execute the method in the first aspect or any possible implementation form of the first aspect.

In a sixth aspect, a network device is provided, including a memory for storing instructions, and a processor for executing the instructions stored in the memory, and when the processor executes the instructions stored in the memory, the execution causes the processor to execute the method in the second aspect or any possible implementation form of the second aspect.

In a seventh aspect, a computer readable medium is provided for storing a computer program including instructions for executing a method in the first aspect or any possible implementation form of the first aspect.

In an eighth aspect, a computer readable medium is provided for storing a computer program including instructions for executing a method in the second aspect or any possible implementation form of the second aspect.

In a ninth aspect, a computer program product is provided including instructions that when a computer runs the instructions of the computer program product, the computer executes a method for transmitting channels in the above-recited first aspect or any possible implementation form of the first aspect. Specifically, the computer program product may be run on the terminal device of the above-recited third aspect.

In a tenth aspect, a computer program product is provided including instructions that when a computer runs the instructions of the computer program product, the computer executes a method for transmitting channels in the above-recited second aspect or any possible implementation form of the second aspect. Specifically, the computer program product may be run on the network device in the above-recited fourth aspect.

BRIEF DESCRIPTION OF THE DRAWINGS

FIG. 6 is another schematic flowchart of a method for transmitting channels according to an embodiment of the present application.

DESCRIPTION OF EMBODIMENTS

The technical solution in the embodiments of the present application will be described below with reference to the accompanying drawings.

The technical solutions of the embodiments of the present application can be applied to various communication systems, such as the global system of mobile communication (GSMC) system, code division multiple access (CDMA) system, wideband code division multiple access (WCDMA) system, general packet radio service (GPRS), long term evolution (LTE) system, LTE frequency division duplex (FDD) system, LTE Time Division Duplex (TDD), universal mobile telecommunication system (UMTS), worldwide interoperability for microwave access (WiMAX) communication system, future 5th generation (5G) system or new radio (NR), and the like.

The terminal device in the embodiments of the present application may refer to the user device, access terminal, user unit, user station, mobile station, mobile platform, remote station, remote terminal, mobile device, user terminal, terminal, wireless communication device, user agent or user equipment. Terminal devices can also be cellular phones, cordless phones, session initiation protocol (SIP) phones, wireless local loop (WLL) stations, personal digital assistants (PDAs), handheld devices with wireless communication function, computing devices or other processing devices connected to wireless modems, vehicle-mounted devices, wearable devices, terminal devices in future 5G networks or public land mobile network (PLMN) in the future evolution, and the like, which is not limited in the embodiments of the present application.

The network device in the embodiments of the present application may be a device for communicating with a terminal device, and the network device may be a base transceiver station (BTS) in the GSMC system or CDMA, or a NodeB (NB) in the WCDMA system, or an evolutionary NodeB (eNB or eNodeB) in the LTE system, or a wireless controller under the cloud radio access network (CRAN) scenario, or the network device may be a relay station, access point, vehicle-mounted device, wearable device and network device in future 5G network, or the network device in the future evolved PLMN network, etc. which is not limited in the embodiments of the present application.

Figure 1:
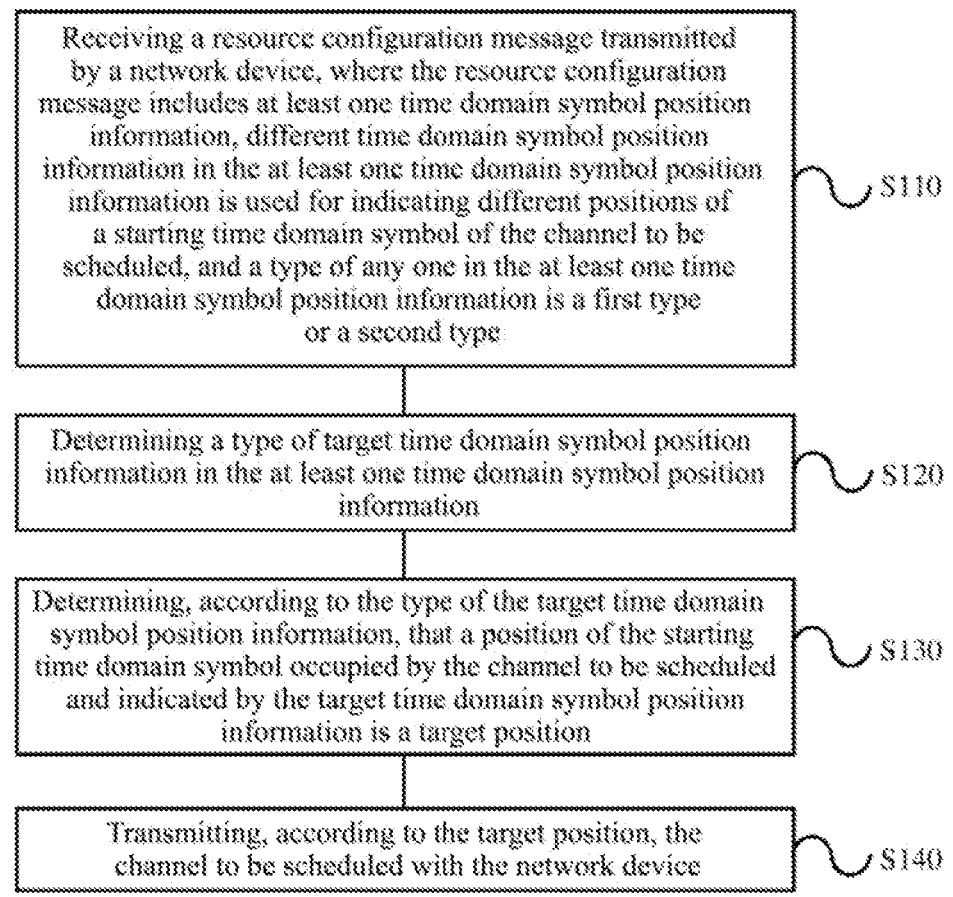
FIG. 1 is a schematic flowchart of a method for transmitting channels according to an embodiment of the present application.

FIG. 1 shows a schematic flowchart of a method 100 for transmitting channels according to an embodiment of the present application, where the method 100 may be executed by a terminal device. As shown in FIG. 1, the method 100 includes: SI 10, receiving a resource configuration message transmitted by a network device, where the resource configuration message includes at least one time domain symbol position information, different time domain symbol position information in the at least one time domain symbol position information is used for indicating different positions of a starting time domain symbol of the channel to be scheduled, and a type of any one in the at least one time domain symbol position information is a first type or a second type, where time domain symbol position information for the first type is used for indicating a relative position between the starting time domain symbol occupied by the channel to be scheduled and a time slot where the channel to be scheduled is located, and time domain symbol position information for the second type is used for indicating a relative position between the starting time domain symbol occupied by the channel to be scheduled and time domain resources where target control information is located; S120, determining a type of target time domain symbol position information in the at least one time domain symbol position information; S130, determining, according to the type of the target time domain symbol position information, that a position of the starting time domain symbol occupied by the channel to be scheduled and indicated by the target time domain symbol position information is a target position; S140, transmitting, according to the target position, the channel to be scheduled with the network device.

Optionally, the channel to be scheduled in the embodiment of the present application may be any one of PUCCH, PDCCH, PUSCH, and PDSCH.

Specifically, in S110, the terminal device receives a resource configuration message transmitted by the network device, and the resource configuration message includes at least one time domain symbol location information. For example, the resource configuration message may be RRC signaling or system information, that is, the terminal device receives RRC signaling or system information transmitted by the network device, where the RRC signaling or the system information includes the at least one time domain symbol location information, and where different time domain symbol position information in the at least one time domain symbol position information is used for indicating different time domain positions. The different time domain position indicates a possible position of the starting time domain symbol occupied by the channel to be scheduled, and for any one of the at least one time domain symbol position information, the type of the any one time domain symbol position information is the first type or the second type, and time domain symbol position information for different types indicate, in different ways, the starting time domain symbol position occupied by the channel to be scheduled.

Specifically, time domain symbol position information for the first type is used for indicating a relative position between the starting time domain symbol occupied by the channel to be scheduled and a time slot where the channel to be scheduled is located; time domain symbol position information for the second type is used for indicating a relative position between the starting time domain symbol occupied by the channel to be scheduled and the time domain resources where the target control information is located.

It should be understood that the target control information in the embodiment of the present application may be downlink control information (DCI) for scheduling the channel to be scheduled, which is not limited in the embodiment of the present application.

In the embodiment of the present application, the method 100 further includes: determining, by the terminal device, a target time domain symbol position information in the at least one time domain symbol position information, and in S120, determining, by the terminal device, a type of the target time domain symbol position information, that is, determining the target time domain symbol position information is of the first type or the second type.

It should be understood that the determining, by the terminal device, target time domain symbol position information in the at least one time domain symbol position information may include: receiving, by the terminal device, target control information transmitted by the network device, where the target control information is used for indicating the target time domain symbol position information, so that the terminal device determines target time domain symbol position information according to the target control information. Specifically, the target control information may include an identification of the target time domain symbol position information, for example, including a serial number of the target time domain symbol position information. Each of the at least one time domain symbol position information received by the terminal device has its own serial number, and the terminal device determines, according to the serial number included in the target control information, the corresponding target time domain symbol position information.

In the embodiment of the present application, the determining, by the terminal device, the type of the target time domain symbol position information may include: receiving, by the terminal device, target control information transmitted by the network device, where the target control information is used for indicating the target time domain symbol position information and the type of the target time domain symbol position information.

Optionally, the determining, by the terminal device, the type of the target time domain symbol position information may further include: the target time domain symbol position information including a type parameter, and the terminal device determines the type of target time domain symbol position information according to the type parameter. For example, each of the at least one time domain symbol position information received by the terminal device includes a type parameter, and the type parameter is used for indicating the type of the corresponding time domain symbol position information, that is, the type parameter included in the target time domain symbol position information is used for indicating the type of the target time domain symbol position information.

Optionally, the determining, by the terminal device, the type of the target time domain symbol position information may further include: determining the type of target time domain symbol position information according to a preset rule. Specifically, the terminal device receives a resource configuration message transmitted by the network device, the resource configuration message includes at least one time domain symbol position information, and also includes at least one time slot-level offset parameter corresponding to the at least one time domain symbol position information, each of the time slot-level offset parameters is used for indicating the type of corresponding time domain symbol position information, for example, the target time slot-level offset parameter corresponding to the target time-domain symbol position information is used for indicating the type of the target time domain symbol position information.

Specifically, the terminal device determines the type of target time domain symbol position information according to a preset rule, where the preset rule may be: the terminal device determines the type of target time domain symbol position information according to the target time slot-level offset parameter. Specifically, if the target time slot-level offset parameter is not equal to 0, the type of the target time domain symbol position information is the first type, and if the target time slot-level offset parameter is equal to 0, the type of the target time domain symbol position information is the second type, while the embodiment of the present application is not limited to this.

In the embodiment of the present application, the position indicated by the target time domain symbol position information is determined according to the type of the target time domain symbol position information. Specifically, the target time domain symbol position information may be any one in the at least one time domain symbol position information, the target time domain symbol position information includes a relative position parameter, the type of the target time domain symbol position information may be the first type or the second type, and correspondingly, the relative position parameter in the target time domain symbol position information also indicates different meanings.

Optionally, as an embodiment, if the target time domain symbol position information is the time domain symbol position information for the first type, that is, the target time domain symbol position information is used for indicating a relative position between the starting time domain symbol occupied by the channel to be scheduled and the time slot where the channel to be scheduled is located, the relative position parameter in the target time domain symbol position information may indicate the relative position between the starting time domain symbol occupied by the channel to be scheduled and the starting time domain symbol of the time slot where the channel to be scheduled is located.

Figure 2:
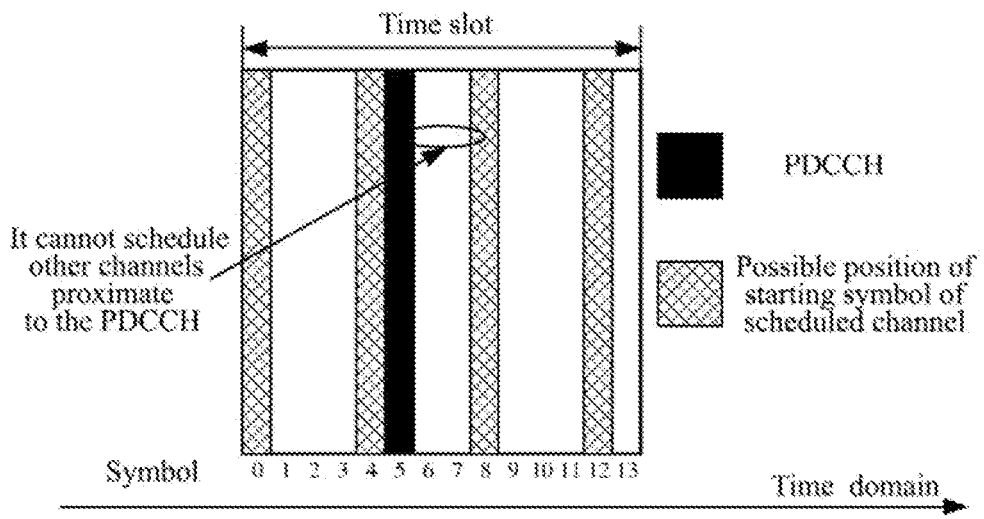
FIG. 2 is a schematic diagram of positions of the starting time domain symbol occupied by the channel to be scheduled according to an embodiment of the present application.

Specifically, taking FIG. 2 as an example, for a time slot, it includes 14 time domain symbols, and the time domain symbol may be an orthogonal frequency division multiplexing (OFDM) symbol. Because it is not known in advance where the downlink control channel is located in the time slot, it is generally to distribute possible starting symbol positions as evenly as possible within the time slot. For example, the four positions of the crossed wireframe in FIG. 2 are located at the 0th, 4th, 8th and 12th time domain symbols respectively, the relative positions between these 4 positions and the starting time domain symbol position of the time slot are 0, 4, 8, and 12, respectively, then the four first-type time-domain symbol position information may be used to respectively indicate the four positions as the positions of the starting time domain symbol occupied by the channel to be scheduled. For example, if the target time domain symbol position information is of the first type and the target time domain symbol position information indicates that the position of the starting time domain symbol occupied by the channel to be scheduled is time domain symbol 4 in FIG. 2, the relative position parameter in the target time domain symbol position information indicates the relative position between the starting time domain symbol occupied by the channel to be scheduled and the starting time domain symbol of the time slot, that is, 4 time domain symbols.

As for the time domain symbol position information using the first type, since the position of the downlink control channel (e.g., PDCCH) is not known in advance, it is assumed that the PDCCH is located at the position of the time domain symbol 5 as shown in FIG. 2, then the starting symbol position occupied by the channel to be scheduled would generally select the position closest to the PDCCH, i.e., the time domain symbol 8. However, such selection still causes that there is an interval of two time domain symbols between the both, which will cause that the channel to be scheduled cannot be transmitted proximate to the PDCCH, and therefore, the scheduling with low delay cannot be realized.

Optionally, as an embodiment, if the target time domain symbol position information is the time domain symbol position information for the second type, that is, the target time domain symbol position information is used for indicating a relative position between the starting time domain symbol occupied by the channel to be scheduled and the time domain resources where the target control information is located, the relative position parameter in the target time domain symbol position information may indicate the relative position between the starting time domain symbol occupied by the channel to be scheduled and the time domain resources where the target control information is located. Optionally, the relative position parameter in the target time domain symbol position information may also indicate a relative position between the starting time domain symbol occupied by the channel to be scheduled and a starting time domain symbol or an end time domain symbol of a control resource set or search space where the target control information is located.

Figure 3:
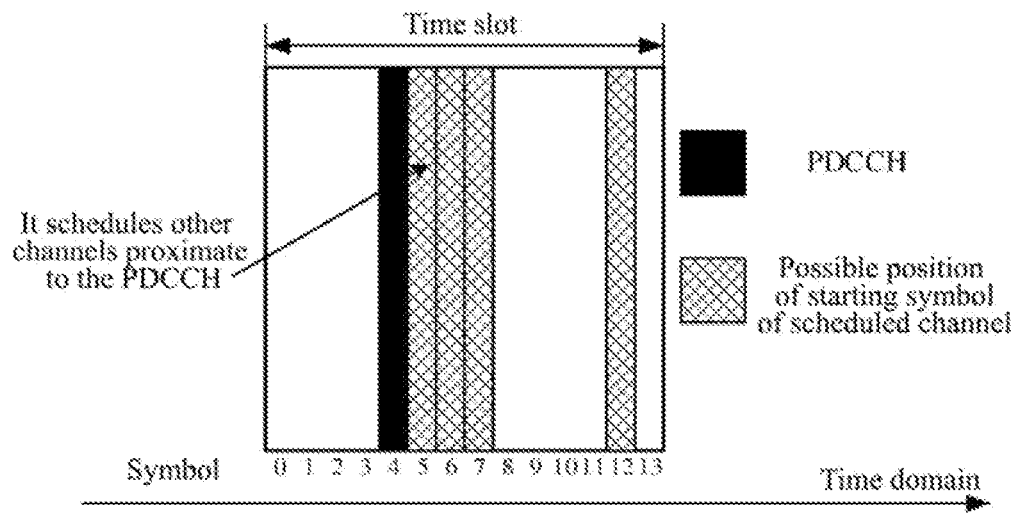
FIG. 3 is another schematic diagram of positions of the starting time domain symbol occupied by the channel to be scheduled according to an embodiment of the present application.

Specifically, taking FIG. 3 as an example, similarly, a time slot including 14 time domain symbols, and the time domain symbols may be OFDM symbols. For the downlink control channel carrying target control information, such as PDCCH, it may be located at any position. After the position of PDCCH is determined, the starting symbol of the channel to be scheduled may be configured at any position behind the position of PDCCH, for example, PDCCH is located at time domain symbol 4 in FIG. 3, and the time domain symbols 5, 6, 7 and 12 behind the time domain symbol 4 can be set as possible positions of the starting time domain symbol of the channel to be scheduled. The relative positions between these four positions and the time domain symbol occupied by PDCCH are 1, 2, 3 and 7 respectively, and the four time domain symbol position information for the second type may be used to respectively indicate these four positions as the positions of the starting time domain symbol occupied by the channel to be scheduled. For example, if the target time domain symbol position information is of the second type, and the target time domain symbol position information indicates that the position of the starting time domain symbol occupied by the channel to be scheduled is the time domain symbol 6 in FIG. 3, then the relative position parameter in the target time domain symbol position information indicates the relative position between the starting time domain symbol occupied by the channel to be scheduled and the starting time domain symbol occupied by the target control information (i.e., PDCCH), that is, two time domain symbols.

It should be understood that when the target time domain symbol position information is of the second type, the relative position parameter in the target time domain symbol position information may also indicate a relative position between the starting time domain symbol occupied by the channel to be scheduled and a control resource set or search space where the target control information is located, for example, the starting or ending position of the control resource set or the search space may be taken as a basis.

Figure 4:
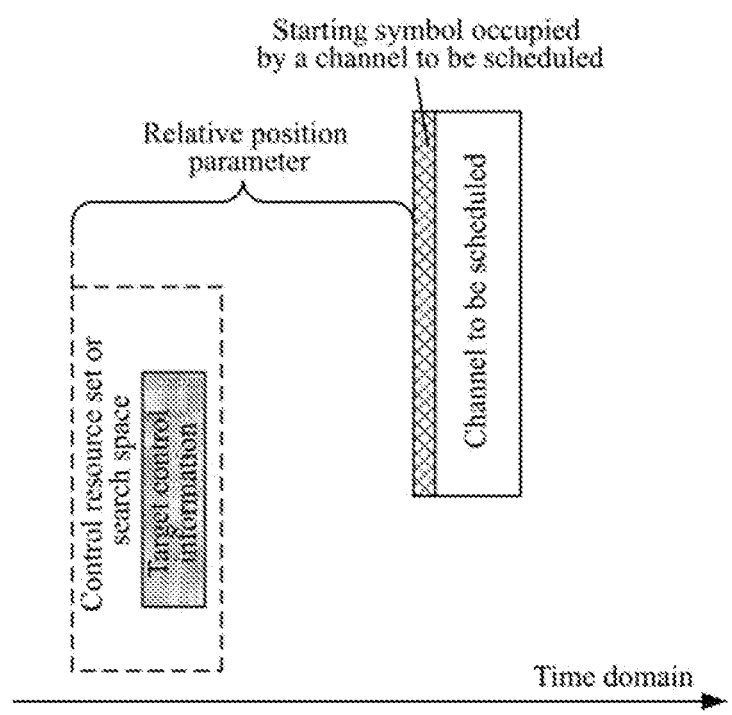
FIG. 4 is yet another schematic diagram of positions of the starting time domain symbol occupied by the channel to be scheduled according to an embodiment of the present application.

Optionally, taking FIG. 4 as an example, the starting time domain symbol occupied by the channel to be scheduled is shown by the crossed wireframe in FIG. 4, and the time domain resource occupied by the control resource set or the search space where the target control information is located is shown by the dashed wireframe in FIG. 4, and correspondingly, as shown in FIG. 4, the relative position parameter in the target time domain symbol position information can indicate the relative position between the starting time domain symbol occupied by the channel to be scheduled and the starting time domain symbol of the control resource set or the search space where the target control information is located.

Figure 5:
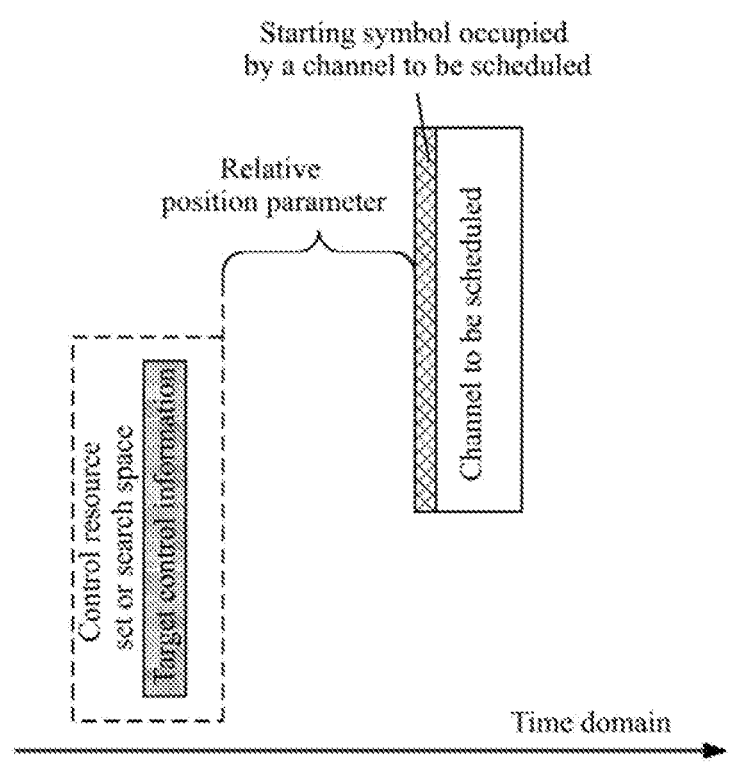
FIG. 5 is still another schematic diagram of positions of the starting time domain symbol occupied by the channel to be scheduled according to an embodiment of the present application.

Optionally, taking FIG. 5 as an example, the starting time domain symbol occupied by the channel to be scheduled is shown by the crossed wireframe in FIG. 5, and the time domain resource occupied by the control resource set or the search space where the target control information is located is shown by the dashed wireframe in FIG. 5, and then correspondingly, as shown in FIG. 5, the relative position parameter in the target time domain symbol position information can indicate the relative position between the starting time domain symbol occupied by the channel to be scheduled and the ending time domain symbol of the control resource set or the search space where the target control information is located.

However, for the target time domain symbol position information using the second type, since it is not possible to effectively schedule the channel far away from the PDCCH, for example, when the distance between the starting symbol of the channel to be scheduled and the PDCCH exceeds 1 slot, by indicating in this way, the overhead of time domain symbol position information for the second type increases sharply. Therefore, it is usually used when the distance between the channel to be scheduled and the PDCCH is relatively short.

It should be understood that each of the at least one time domain symbol position information in the embodiment of the present application may further include a length parameter, for example, the target time domain symbol position information includes the length parameter, and the length parameter may indicate the length of the time domain resources occupied by the channel to be scheduled, such as the number of time domain symbols occupied by the channel to be scheduled, while the embodiment of the present application is not limited thereto.

It should be understood that the time domain resources occupied by the channel to be scheduled in the embodiment of the present application may be continuous, that is, it may be one or more time domain symbols in connection; alternatively, the time domain resources occupied by the channel to be scheduled may also be discontinuous, for example, the position of each time domain symbol in the time domain resources occupied by the channel to be scheduled may be determined by a correlation algorithm, and the embodiment of the present application is not limited thereto.

In S130, determining, by the terminal device, according to the type of the target time domain symbol position information, that the indication position of the target time domain symbol position information is the target position, and the target position is the position of the starting time domain symbol occupied by the channel to be scheduled; and in S140, transmitting, by the terminal device, according to the target position, the channel to be scheduled with the network device.

Therefore, in the method for transmitting channels in the embodiment of the present application, the terminal device receives at least one time domain symbol position information transmitted by the network device, and different time domain symbol position information is used for indicating different positions of the time domain symbol occupied by the channel to be scheduled; the terminal device determines target time domain symbol position information in the at least one time domain symbol position information and the type of the target time domain symbol position information, and then determines a position indicated by the target time domain symbol position information and transmits the channel to be scheduled through the position. Because types of target time domain symbol position information are different, and ways of indicating the time domain symbol position are also different, thereby realizing flexible indication of the time domain symbol position information for two types. For example, when the channel to be scheduled is closer to the downlink control channel, a relative downlink control channel can be used to indicate the starting symbol position of the channel to be scheduled, while when the channel to be scheduled is farther from the downlink control channel, a time slot starting position where a relative channel to be scheduled is located can be used to indicate the starting symbol position of the channel to be scheduled.

In this way, no matter where the downlink control channel is located in the time slot, the limited control signaling overhead can be fully utilized to effectively indicate the starting symbol position of the channel to be scheduled, thus realizing more flexible, more efficient and lower time delay data channel resource allocation.

The method for transmitting channels according to an embodiment of the present application is described above in detail from the perspective of a terminal device by reference to FIG. 1 to FIG. 5, and the method for transmitting channels according to an embodiment of the present application will be described below from the perspective of a network device by reference to FIG. 6.

FIG. 6 shows a schematic flowchart of a method 200 for transmitting channels according to an embodiment of the present application, which may be executed by a network device. As shown in FIG. 6, the method 200 includes: S210, transmitting a resource configuration message to a terminal device, where the resource configuration message includes at least one time domain symbol position information, and different time domain symbol position information in the at least one time domain symbol position information is used for indicating different positions of the starting time domain symbol occupied by a channel to be scheduled of the terminal device; a type of any one in the at least one time domain symbol position information is a first type or a second type, time domain symbol position information for the first type is used for indicating a relative position between the starting time domain symbol occupied by the channel to be scheduled and the time slot where the channel to be scheduled is located, and time domain symbol position information for the second type is used for indicating a relative position between the starting time domain symbol occupied by the channel to be scheduled and the time domain resources where the target control information is located; S220, transmitting the target control information to the terminal device, where the target control information is used for the terminal device to determine target time domain symbol position information in the at least one time domain symbol position information; S230, transmitting the channel to be scheduled with the terminal device according to the position of the starting time domain symbol occupied by the channel to be scheduled and indicated by the target control information.

Therefore, in the method for transmitting channels according to the embodiment of the present application, the network device configures at least one time domain symbol position information for the terminal device, different time domain symbol position information is used for indicating different positions of the time domain symbol occupied by the channel to be scheduled, and transmits to the terminal device information for indicating target time domain symbol position information in the at least one time domain symbol position information, which facilitates determination of the target time domain symbol position information by the terminal device, so as to determine the type of the target time domain symbol position information and determines the position indicated by the target time domain symbol position information, so that the channel to be scheduled is transmitted through the position with the network device. Because types of target time domain symbol position information are different, and ways of indicating the time domain symbol position are also different, thereby realizing flexible indication of the time domain symbol position information for two types. For example, when the channel to be scheduled is closer to the downlink control channel, a relative downlink control channel can be used to indicate the starting symbol position of the channel to be scheduled, while when the channel to be scheduled is farther from the downlink control channel, a time slot starting position where a relative channel to be scheduled is located can be used to indicate the starting symbol position of the channel to be scheduled.

In this way, no matter where the downlink control channel is located in the time slot, the limited control signaling overhead can be fully utilized to effectively indicate the starting symbol position of the channel to be scheduled, thus realizing more flexible, more efficient and lower time delay data channel resource allocation.

Optionally, the target time domain symbol position information includes a relative position parameter, and if the target time domain symbol position information is of the first type, the relative position parameter is used for indicating a relative position between the starting time domain symbol occupied by the channel to be scheduled and the starting time domain symbol of a time slot where the channel to be scheduled is located; if the target time domain symbol position information is of the second type, the relative position parameter is used for indicating a relative position between the starting time domain symbol occupied by the channel to be scheduled and the time domain resources where the target control information is located.

Optionally, if the target time domain symbol position information is of the second type, the relative position parameter is used for indicating a relative position between the starting time domain symbol occupied by the channel to be scheduled and a starting time domain symbol or an ending time domain symbol of a control resource set or search space where the target control information is located.

Optionally, the target time domain symbol position information includes a length parameter, where the length parameter indicates a length of the time domain resources occupied by the channel to be scheduled.

Optionally, the target time domain symbol position information includes a type parameter, where the type parameter is used for indicating the type of the target time domain symbol position information.

Optionally, the target control information includes a type parameter, where the type parameter is used for indicating the type of the target time domain symbol position information.

Optionally, the resource configuration message includes at least one time slot-level offset parameter corresponding to the at least one time domain symbol position information, and the target time domain symbol position information corresponds to a target time slot-level offset parameter, and the target time slot-level offset parameter is used for indicating the type of the target time domain symbol position information.

Optionally, the type of the target time domain symbol position information is the first type if the target time slot-level offset parameter is not equal to 0; or the type of the target time domain symbol position information is the second type if the target time slot-level offset parameter is less than or equal to a preset value.

Optionally, the channel to be scheduled is any one of PUCCH, PDCCH, PUSCH and PDSCH.

Optionally, the resource configuration message is RRC signaling or system information.

Optionally, the target control information is DCI for scheduling the channel to be scheduled.

It should be understood that the network device in the method 200 may correspond to the network device in the method 100 in the embodiment of the present application, and the terminal device in the method 200 may correspond to the terminal device in the method 100 in the embodiment of the present application, which will not be repeated herein.

Therefore, in the method for transmitting channels in the embodiment of the present application, the network device configures at least one time domain symbol position information for the terminal device, different time domain symbol position information is used for indicating different positions of the time domain symbol occupied by the channel to be scheduled, and transmits to the terminal device information for indicating target time domain symbol position information in the at least one time domain symbol position information, which facilitates determination of the target time domain symbol position information by the terminal device, so as to determine the type of the target time domain symbol position information and determines the position indicated by the target time domain symbol position information, so that the channel to be scheduled is transmitted through the position with the network device. Because types of target time domain symbol position information are different, and ways of indicating the time domain symbol position are also different, thereby realizing flexible indication of the time domain symbol position information for two types. For example, when the channel to be scheduled is closer to the downlink control channel, a relative downlink control channel can be used to indicate the starting symbol position of the channel to be scheduled, while when the channel to be scheduled is farther from the downlink control channel, a time slot starting position where a relative channel to be scheduled is located can be used to indicate the starting symbol position of the channel to be scheduled.

In this way, no matter where the downlink control channel is located in the time slot, the limited control signaling overhead can be fully utilized to effectively indicate the starting symbol position of the channel to be scheduled, thus realizing more flexible, more efficient and lower time delay data channel resource allocation.

It should be understood that in various embodiments of the present application, sequence numbers of the above-mentioned processes do not mean the sequence of execution, and the execution sequence of each process should be determined by its function and internal logic, and should not be constructed to be any limitation to the implementation process of the embodiments of the present application.

In addition, the term "and/or" used herein is only an association relationship describing the associated objects, which means that there can be three kinds of relationships, for example, A and/or B, which can mean that there are three cases: A exists alone, A and B exist simultaneously, and B exists alone. In addition, the character "/" used herein generally indicates that the associated objects throughout the context are of the "or" relationship.

The method for transmitting channels according to an embodiment of the present application is described in detail above with reference to FIG. 1 to FIG. 6. The terminal device and the network device according to an embodiment of the present application will be described below with reference to FIG. 7 to FIG. 10.

Figure 7:
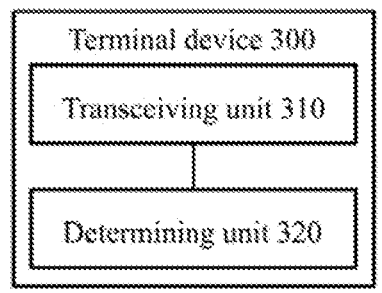
FIG. 7 is a schematic block diagram of a terminal device according to an embodiment of the present application.

As shown in FIG. 7, the terminal device 300 according to the embodiment of the present application includes a transceiving unit 310 and a determining unit 320. Specifically, the transceiving unit 310 is configured to receive a resource configuration message transmitted by a network device, where the resource configuration message includes at least one time domain symbol position information, different time domain symbol position information in the at least one time domain symbol position information is used for indicating different positions of the starting time domain symbol occupied by the channel to be scheduled, and a type of any one in the at least one time domain symbol position information is a first type or a second type, where time domain symbol position information for the first type is used for indicating a relative position between the starting time domain symbol occupied by the channel to be scheduled and the time slot where the channel to be scheduled is located, and time domain symbol position information for the second type is used for indicating a relative position between the starting time domain symbol occupied by the channel to be scheduled and the time domain resources where the target control information is located; the determining unit 320 is configured to determine a type of target time domain symbol position information in the at least one time domain symbol position information; the determining unit 320 is configured to determine, according to the type of the target time domain symbol position information, that a position of the starting time domain symbol occupied by the channel to be scheduled and indicated by the target time domain symbol position information is a target position; the transceiving unit 310 is configured to transmit the channel to be scheduled with the network device according to the target position.

Optionally, the target time domain symbol position information includes a relative position parameter, and if the target time domain symbol position information is of the first type, the relative position parameter is used for indicating a relative position between the starting time domain symbol occupied by the channel to be scheduled and the starting time domain symbol of a time slot where the channel to be scheduled is located; if the target time domain symbol position information is of the second type, the relative position parameter is used for indicating a relative position between the starting time domain symbol occupied by the channel to be scheduled and the time domain resources where the target control information is located.

Optionally, if the target time domain symbol position information is of the second type, the relative position parameter is used for indicating a relative position between the starting time domain symbol occupied by the channel to be scheduled and a starting time domain symbol or an ending time domain symbol of a control resource set or search space where the target control information is located.

Optionally, the target time domain symbol position information includes a length parameter, where the length parameter indicates a length of the time domain resources occupied by the channel to be scheduled.

Optionally, the transceiving unit 310 is specifically configured to receive the target control information transmitted by the network device before the determining unit 320 determines the type of target time domain symbol position information in the at least one time domain symbol position information, where the target control information is used for indicating the target time domain symbol position information; the determining unit 320 is specifically configured to determine the target time domain symbol position information according to the target control information.

Optionally, the target control information includes a type parameter, where the type parameter is used for indicating the type of the target time domain symbol position information.

Optionally, the target time domain symbol position information includes a type parameter, where the type parameter is used for indicating the type of the target time domain symbol position information.

Optionally, the resource configuration message includes at least one time slot-level offset parameter corresponding to the at least one time domain symbol position information, and the target time domain symbol position information corresponds to the target time slot-level offset parameter. The determining unit 320 is specifically configured to determine the type of the target time domain symbol position information according to the target time slot-level offset parameter.

Optionally, the determining unit 320 is specifically configured to: determine the type of the target time domain symbol position information as the first type if the target time slot-level offset parameter is not equal to 0; or determine the type of the target time domain symbol position information as the second type if the target time slot-level offset parameter is equal to 0.

Optionally, the channel to be scheduled is any one of PUCCH, PDCCH, PUSCH and PDSCH.

Optionally, the resource configuration message is RRC signaling or system information.

Optionally, the target control information is downlink control information DCI for scheduling the channel to be scheduled.

It should be understood that the terminal device 300 according to the embodiment of the present application may correspond to the method 100 for executing the embodiment of the present application, and the above-mentioned and other operations and/or functions of each unit in the terminal device 300 are used to respectively realize the corresponding flow of the terminal device of each method in FIG. 1 to FIG. 6, which will not be repeated herein for brevity.

Therefore, the terminal device according to the embodiment of the present application receives the at least one time domain symbol position information transmitted by the network device, different time domain symbol position information is used for indicating different positions of the time domain symbol occupied by the channel to be scheduled, and the terminal device determines the target time domain symbol position information in the at least one time domain symbol position information and the type of the target time domain symbol position information, and then determines the position indicated by the target time domain symbol position information and transmits the channel to be scheduled through the position. Because types of target time domain symbol position information are different, and ways of indicating the time domain symbol position are also different, thereby realizing flexible indication of the time domain symbol position information for two types. For example, when the channel to be scheduled is closer to the downlink control channel, a relative downlink control channel can be used to indicate the starting symbol position of the channel to be scheduled, while when the channel to be scheduled is farther from the downlink control channel, a time slot starting position where a relative channel to be scheduled is located can be used to indicate the starting symbol position of the channel to be scheduled.

In this way, no matter where the downlink control channel is located in the time slot, the limited control signaling overhead can be fully utilized to effectively indicate the starting symbol position of the channel to be scheduled, thus realizing more flexible, more efficient and lower time delay data channel resource allocation.

Figure 8:
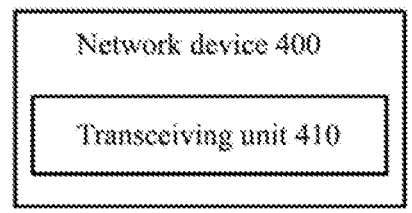
FIG. 8 is a schematic block diagram of a network device according to an embodiment of the present application.

As shown in FIG. 8, the network device 400 according to the embodiment of the present application includes a transceiving unit 410. Specifically, the transceiving unit 410 is configured to: transmit a resource configuration message to a terminal device, where the resource configuration message includes at least one time domain symbol position information, different time domain symbol position information in the at least one time domain symbol position information is used for indicating different positions of the starting time domain symbol occupied by the channel to be scheduled of the terminal device, and a type of any one in the at least one time domain symbol position information is a first type or a second type, where time domain symbol position information for the first type is used for indicating a relative position between the starting time domain symbol occupied by the channel to be scheduled and the time slot where the channel to be scheduled is located, and time domain symbol position information for the second type is used for indicating a relative position between the starting time domain symbol occupied by the channel to be scheduled and the time domain resources where the target control information is located; transmit the target control information to the terminal device, where the target control information is used for the terminal device to determine target time domain symbol position information in the at least one time domain symbol position information; transmit the channel to be scheduled with the terminal device according to the position of the starting time domain symbol occupied by the channel to be scheduled and indicated by the target control information.

Optionally, the target time domain symbol position information includes a relative position parameter, and if the target time domain symbol position information is of the first type, the relative position parameter is used for indicating a relative position between the starting time domain symbol occupied by the channel to be scheduled and the starting time domain symbol of a time slot where the channel to be scheduled is located; if the target time domain symbol position information is of the second type, the relative position parameter is used for indicating a relative position between the starting time domain symbol occupied by the channel to be scheduled and the time domain resources where the target control information is located.

Optionally, if the target time domain symbol position information is of the second type, the relative position parameter is used for indicating a relative position between the starting time domain symbol occupied by the channel to be scheduled and a starting time domain symbol or an ending time domain symbol of a control resource set or search space where the target control information is located.

Optionally, the target time domain symbol position information includes a length parameter, where the length parameter indicates a length of the time domain resources occupied by the channel to be scheduled.

Optionally, the target time domain symbol position information includes a type parameter, where the type parameter is used for indicating a type of the target time domain symbol position information.

Optionally, the target control information includes a type parameter, where the type parameter is used for indicating a type of the target time domain symbol position information.

Optionally, the resource configuration message includes at least one time slot-level offset parameter corresponding to the at least one time domain symbol position information, and the target time domain symbol position information corresponds to the target time slot-level offset parameter, and the target time slot-level offset parameter is used for indicating a type of the target time domain symbol position information.

Optionally, the type of the target time domain symbol position information is the first type if the target time slot-level offset parameter is not equal to 0; or the type of the target time domain symbol position information is the second type if the target time slot-level offset parameter is less than or equal to a preset value.

Optionally, the channel to be scheduled is any one of PUCCH, PDCCH, PUSCH and PDSCH.

Optionally, the resource configuration message is RRC signaling or system information.

Optionally, the target control information is DCI for scheduling the channel to be scheduled.

It should be understood that the network device 400 according to the embodiment of the present application may correspond to the method 200 for executing the embodiment of the present application, and the above-mentioned and other operations and/or functions of each unit in the network device 400 are used to respectively realize the corresponding flow of the network device of each method in FIG. 1 to FIG. 6, which will not be repeated herein for brevity.

Therefore, the network device according to the embodiment of the present application configures at least one time domain symbol position information for the terminal device, different time domain symbol position information is used for indicating different positions of time domain symbol occupied by the channel to be scheduled, and transmits to the terminal device information for indicating the target time domain symbol position information in the at least one time domain symbol position information, which facilitates determination of the target time domain symbol position information by the terminal device, so as to determine the type of the target time domain symbol position information and determine the position indicated by the target time domain symbol position information, so that the channel to be scheduled is transmitted through the position with the network device. Because types of target time domain symbol position information are different, and ways of indicating the time domain symbol position are also different, thereby realizing flexible indication of the time domain symbol position information for two types. For example, when the channel to be scheduled is closer to the downlink control channel, a relative downlink control channel can be used to indicate the starting symbol position of the channel to be scheduled, while when the channel to be scheduled is farther from the downlink control channel, a time slot starting position where a relative channel to be scheduled is located can be used to indicate the starting symbol position of the channel to be scheduled.

In this way, no matter where the downlink control channel is located in the time slot, the limited control signaling overhead can be fully utilized to effectively indicate the starting symbol position of the channel to be scheduled, thus realizing more flexible, more efficient and lower time delay data channel resource allocation.

Figure 9:
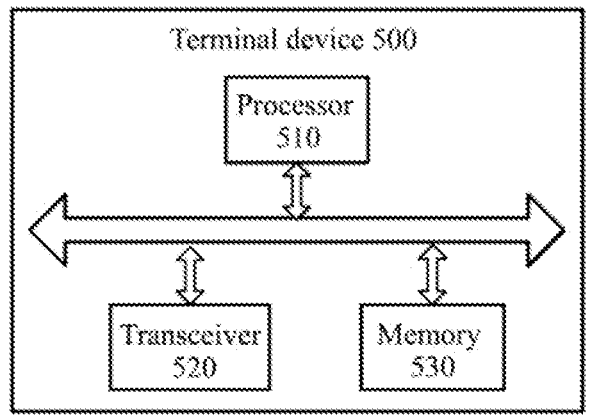
FIG. 9 is another schematic block diagram of a terminal device according to an embodiment of the present application.

FIG. 9 shows a schematic block diagram of a terminal device 500 according to an embodiment of the present application. As shown in FIG. 9, the terminal device 500 includes: a processor 510 and a transceiver 520 that are connected with each other, and optionally, the terminal device 500 further includes a memory 530 connected to the processor 510, where the processor 510, the memory 530, and the transceiver 520 communicate with each other through an internal connection path to transfer and/or control data signals. The memory 530 may be configured to store instructions, where the processor 510 is configured to execute the instructions stored in the memory 530 to control the transceiver 520 to transmit information or signals. The transceiver 520 is configured to: receive a resource configuration message transmitted by the network device, where the resource configuration message includes at least one time domain symbol position information, different time domain symbol position information in the at least one time domain symbol position information is used for indicating different positions of the starting time domain symbol occupied by a channel to be scheduled, and a type of any one in the at least one time domain symbol position information is a first type or a second type, where time domain symbol position information for the first type is used for indicating a relative position between the starting time domain symbol occupied by the channel to be scheduled and the time slot where the channel to be scheduled is located, and time domain symbol position information for the second type is used for indicating a relative position between the starting time domain symbol occupied by the channel to be scheduled and the time domain resources where the target control information is located; the processor 510 is configured to: determine a type of target time domain symbol position information in the at least one time domain symbol position information, and determine, according to the type of the target time domain symbol position information, that a position of the starting time domain symbol occupied by the channel to be scheduled and indicated by the target time domain symbol position information is a target position; the transceiver 520 is configured to transmit the channel to be scheduled with the network device according to the target position.

Optionally, as an embodiment, the target time domain symbol position information includes a relative position parameter, and if the target time domain symbol position information is of the first type, the relative position parameter is used for indicating a relative position between the starting time domain symbol occupied by the channel to be scheduled and the starting time domain symbol of a time slot where the channel to be scheduled is located; if the target time domain symbol position information is of the second type, the relative position parameter is used for indicating a relative position between the starting time domain symbol occupied by the channel to be scheduled and the time domain resources where the target control information is located.

Optionally, as an embodiment, if the target time domain symbol position information is of the second type, the relative position parameter is used for indicating a relative position between the starting time domain symbol occupied by the channel to be scheduled and a starting time domain symbol or an ending time domain symbol of a control resource set or search space where the target control information is located.

Optionally, as an embodiment, the target time domain symbol position information includes a length parameter, where the length parameter indicates a length of the time domain resources occupied by the channel to be scheduled.

Optionally, as an embodiment, the transceiver 520 is configured to receive the target control information transmitted by the network device before the processor 510 determines the type of target time domain symbol position information in the at least one time domain symbol position information, where the target control information is used for indicating the target time domain symbol position information; the processor 510 is configured to determine the target time domain symbol position information according to the target control information.

Optionally, as an embodiment, the target control information includes a type parameter, where the type parameter is used for indicating the type of the target time domain symbol position information.

Optionally, as an embodiment, the target time domain symbol position information includes a type parameter, where the type parameter is used for indicating the type of the target time domain symbol position information.

Optionally, as an embodiment, the resource configuration message includes at least one time slot-level offset parameter corresponding to the at least one time domain symbol position information, and the target time domain symbol position information corresponds to a target time slot-level offset parameter. The processor 510 is configured to determine the type of the target time domain symbol position information according to the target time slot-level offset parameter.

Optionally, as an embodiment, the processor 510 is configured to: determine the type of the target time domain symbol position information as the first type if the target time slot-level offset parameter is not equal to 0; or determine the type of the target time domain symbol position information as the second type if the target time slot-level offset parameter is equal to 0.

Optionally, as an embodiment, the channel to be scheduled is any one of PUCCH, PDCCH, PUSCH and PDSCH.

Optionally, as an embodiment, the resource configuration message is RRC signaling or system information.

Optionally, as an embodiment, the target control information is DCI for scheduling the channel to be scheduled.

It should be understood that the terminal device 500 according to the embodiment of the present application may correspond to the terminal device 300 in the embodiment of the present application and correspond to a corresponding body in executing the method 100 according to the embodiment of the present application, and the above-mentioned and other operations and/or functions of each unit in the terminal device 500 are used to respectively realize the corresponding flow of the terminal device of each method in FIG. 1 to FIG. 6, which will not be repeated herein for brevity.

Therefore, the terminal device according to the embodiment of the present application receives the at least one time domain symbol position information transmitted by the network device, different time domain symbol position information is used for indicating different positions of the time domain symbol occupied by the channel to be scheduled, and the terminal device determines the target time domain symbol position information in the at least one time domain symbol position information and the type of the target time domain symbol position information, and then determines the position indicated by the target time domain symbol position information and transmits the channel to be scheduled through the position. Because types of target time domain symbol position information are different, and ways of indicating the time domain symbol position are also different, thereby realizing flexible indication of the time domain symbol position information for two types. For example, when the channel to be scheduled is closer to the downlink control channel, a relative downlink control channel can be used to indicate the starting symbol position of the channel to be scheduled, while when the channel to be scheduled is farther from the downlink control channel, a time slot starting position where a relative channel to be scheduled is located can be used to indicate the starting symbol position of the channel to be scheduled.

In this way, no matter where the downlink control channel is located in the time slot, the limited control signaling overhead can be fully utilized to effectively indicate the starting symbol position of the channel to be scheduled, thus realizing more flexible, more efficient and lower time delay data channel resource allocation.

Figure 10:
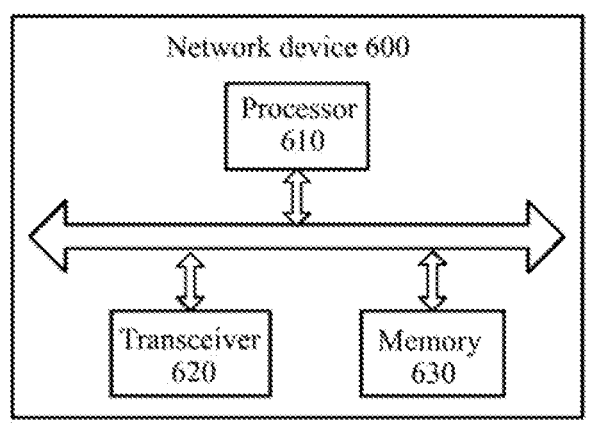
FIG. 10 is another schematic block diagram of a network device according to an embodiment of the present application.

FIG. 10 shows a schematic block diagram of a network device 600 according to an embodiment of the present application. As shown in FIG. 10, the network device 600 includes: a processor 610 and a transceiver 620 that are connected with each other, and optionally, the network device 600 further includes a memory 630 connected to the processor 610, where the processor 610, the memory 630, and the transceiver 620 communicate with each other through an internal connection path to transfer and/or control data signals. The memory 630 may be configured to store instructions, the processor 610 is configured to execute the instructions stored in the memory 630 to control the transceiver 620 to transmit information or signals, and the transceiver 620 is configured to: transmit a resource configuration message to the terminal device, where the resource configuration message includes at least one time domain symbol position information, different time domain symbol position information in the at least one time domain symbol position information is used for indicating different positions of the starting time domain symbol occupied by a channel to be scheduled of the terminal, a type of any one in the at least one time domain symbol position information is a first type or a second type, where time domain symbol position information for the first type is used for indicating a relative position between the starting time domain symbol occupied by the channel to be scheduled and the time slot where the channel to be scheduled is located, and time domain symbol position information for the second type is used for indicating a relative position between the starting time domain symbol occupied by the channel to be scheduled and the time domain resources where the target control information is located; transmit the target control information to the terminal device, where the target control information is used for the terminal device to determine target time domain symbol position information in the at least one time domain symbol position information; transmit the channel to be scheduled with the terminal device according to the position of the starting time domain symbol occupied by the channel to be scheduled and indicated by the target control information.

Optionally, as an embodiment, the target time domain symbol position information includes a relative position parameter, and if the target time domain symbol position information is of the first type, the relative position parameter is used for indicating a relative position between the starting time domain symbol occupied by the channel to be scheduled and the starting time domain symbol of a time slot where the channel to be scheduled is located; if the target time domain symbol position information is of the second type, the relative position parameter is used for indicating a relative position between the starting time domain symbol occupied by the channel to be scheduled and the time domain resources where the target control information is located.

Optionally, as an embodiment, if the target time domain symbol position information is of the second type, the relative position parameter is used for indicating a relative position between the starting time domain symbol occupied by the channel to be scheduled and a starting time domain symbol or an ending time domain symbol of a control resource set or search space where the target control information is located.

Optionally, as an embodiment, the target time domain symbol position information includes a length parameter, where the length parameter indicates a length of the time domain resources occupied by the channel to be scheduled.

Optionally, as an embodiment, the target time domain symbol position information includes a type parameter, where the type parameter is used for indicating a type of the target time domain symbol position information.

Optionally, as an embodiment, the target control information includes a type parameter, where the type parameter is used for indicating a type of the target time domain symbol position information.

Optionally, as an embodiment, the resource configuration message includes at least one time slot-level offset parameter corresponding to the at least one time domain symbol position information, and the target time domain symbol position information corresponds to the target time slot-level offset parameter, where the target time slot-level offset parameter is used for indicating a type of the target time domain symbol position information.

Optionally, as an embodiment, the type of the target time domain symbol position information is the first type if the target time slot-level offset parameter is not equal to 0; or the type of the target time domain symbol position information is the second type if the target time slot-level offset parameter is less than or equal to a preset value.

Optionally, as an embodiment, the channel to be scheduled is any one of PUCCH, PDCCH, PUSCH and PDSCH.

Optionally, as an embodiment, the resource configuration message is RRC signaling or system information.

Optionally, as an embodiment, the target control information is DCI for scheduling the channel to be scheduled.

It should be understood that the network device 600 according to the embodiment of the present application may correspond to the network device 400 in the embodiment of the present application and corresponds to a corresponding body in executing the method 200 according to the embodiment of the present application, and the above-mentioned and other operations and/or functions of each unit in the network device 600 are used to respectively realize the corresponding flow of the network device of each method in FIG. 1 to FIG. 6, which will not be repeated herein for brevity.

Therefore, the network device in the embodiment of the present application configures at least one time domain symbol position information for the terminal device, different time domain symbol position information is used for indicating different positions of the time domain symbol occupied by the channel to be scheduled, and transmits to the terminal device information for indicating target time domain symbol position information in the at least one time domain symbol position information, which facilitates determination of the target time domain symbol position information by the terminal device, so as to determine the type of the target time domain symbol position information and determine the position indicated by the target time domain symbol position information, so that the channel to be scheduled is transmitted through the position with the network device. Because types of target time domain symbol position information are different, and ways of indicating the time domain symbol position are also different, thereby realizing flexible indication of time domain symbol position information for two types. For example, when the channel to be scheduled is closer to the downlink control channel, a relative downlink control channel can be used to indicate the starting symbol position of the channel to be scheduled, while when the channel to be scheduled is farther from the downlink control channel, a time slot starting position where a relative channel to be scheduled is located can be used to indicate the starting symbol position of the channel to be scheduled.

In this way, no matter where the downlink control channel is located in the time slot, the limited control signaling overhead can be fully utilized to effectively indicate the starting symbol position of the channel to be scheduled, thus realizing more flexible, more efficient and lower time delay data channel resource allocation.

It should be noted that the above method embodiments of the present application can be applied to or implemented by a processor. The processor may be an integrated circuit chip with signal processing capability. In the implementation process, each step of the above method embodiment may be completed by an integrated logic circuit of hardware in the processor or instructions in the form of software. The above processor may be a general purpose processor, a digital signal processor (DSP), an application specific integrated circuit (ASIC), a field programmable gate array (FPGA) or other programmable logic devices, discrete gates or transistor logic devices, or discrete hardware components. The disclosed methods, steps and logical block diagrams in the embodiments of the present application may be implemented or executed. The general-purpose processor may be a microprocessor or the processor may be any conventional processor or the like. The steps of the method disclosed in connection with the embodiments of the present application can be directly embodied in the completion of execution by the hardware decoding processor or completion of execution by the combination of hardware and software modules in the decoding processor. The software module may be located in a storage medium mature in the field such as random access memory, flash memory, read-only memory, programmable read-only memory or electrically erasable programmable memory, registers, and the like. The storage medium is located in the memory, and the processor reads the information in the memory and completes the steps of the above method in combination with its hardware.

It should be understood that the memory in the embodiments of the present application may be a volatile memory or a nonvolatile memory, or may include both the volatile and the nonvolatile memory. The nonvolatile memory may be the read-only memory (ROM), programmable rom (PROM), erasable PROM (EPROM), electrically erasable EPROM (EEPROM), or flash memory. The volatile memory may be a random access memory (RAM), which serves as an external cache. By way of example but not limitation, many forms of RAM are available, such as static random access memory (SRAM), dynamic random access memory (DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection dynamic random access memory (synchlink DRAM, SLDRAM) and direct memory bus random access memory (direct rambus RAM, DR RAM). It should be noted that the memories of the systems and methods described herein are intended to include, but are not limited to, these and any other suitable types of memories.

Those of ordinary skill in the art will recognize that the units and algorithm steps of the examples described in connection with the embodiments disclosed herein can be implemented in electronic hardware, or a combination of computer software and electronic hardware. Whether these functions are implemented in hardware or software depends on the specific application and design constraints of the technical solution. Professional technicians may use different methods to implement the described functions for each particular application, but such implementation should not be considered to be beyond the scope of the present application.

Those skilled in the art can clearly understand that for convenience and conciseness of description, the specific working processes of the above-described systems, devices and units can refer to the corresponding processes in the above-described method embodiments, which will not be repeated herein.

In several embodiments provided in the present application, it should be understood that the disclosed systems, devices and methods may be implemented in other ways. For example, the device embodiments described above are only illustrative. For example, the division of the units is only a logic function division. In actual implementation, there may be other division methods, for example, multiple units or components may be combined or integrated into another system, or some features may be ignored or not performed. On the other hand, the mutual coupling or direct coupling or communication connection shown or discussed may be indirect coupling or communication connection through some interfaces, devices or units, and may be in electrical, mechanical or other forms.

The units described as separate components may or may not be physically separate, the components displayed as units may be or may not be physical units, i.e. may be located in one place or may be distributed over multiple network units. Some or all of the units can be selected as required to achieve the purpose of the solution of the present embodiment.

In addition, each functional unit in each embodiment of the present application may be integrated into one processing unit, or each unit may exist physically separately, or two or more units may be integrated into one unit.

If the functions are implemented in the form of software functional units and sold or used as independent products, they can be stored in a computer readable storage medium. Based on this understanding, in essence, the technical solution of the present application or the part that contributes to the prior art or the part of the technical solution can be embodied in the form of a software product, which is stored in a storage medium and includes several instructions to cause a computer device (which can be a personal computer, a server, or a network device, etc.) to perform all or part of the steps of the method according to various embodiments of the present application. The aforementioned storage media include various mediums that can store program codes, such as U disk, mobile hard disk, read-only memory (ROM), random access memory (RAM), magnetic disk or optical disk, and the like.

The above is only a specific implementation of the present application, but the scope of protection of the present application is not limited thereto. The changes or substitutions within the technical scope disclosed in the present application easily thought by any technical person familiar with the present technical field should be covered within the scope of protection of the present application. Therefore, the scope of protection of the present application shall be subject to the scope of protection of the claims.

What is claimed is:

1. A method for transmitting channels, comprising:
receiving, by a terminal device, a resource configuration message, wherein the resource configuration message comprises at least one time domain symbol position information, the at least one time domain symbol position information is used for indicating positions of a starting time domain symbol occupied by a channel to be scheduled, a type of the at least one time domain symbol position information is a first type or a second type, time domain symbol position information for the first type is used for indicating a relative position between the starting time domain symbol occupied by the channel to be scheduled and a time slot where the channel to be scheduled is located, and time domain symbol position information for the second type is used for indicating a relative position between the starting time domain symbol occupied by the channel to be scheduled and time domain resources where target control information is located;
determining, by the terminal device based on the target control information, a type of target time domain symbol position information;
determining, by the terminal device, according to the type of the target time domain symbol position information, that a position of the starting time domain symbol occupied by the channel to be scheduled is a tweet position, wherein the position of the starting time domain symbol occupied by the channel to be scheduled is indicated by the target time domain symbol position information.

2. The method according to claim 1, wherein the target time domain symbol position information comprises a relative position parameter;
if the target time domain symbol position information is of the first type, the relative position parameter is used for indicating a relative position between the starting time domain symbol occupied by the channel to be scheduled and a starting time domain symbol of the time slot where the channel to be scheduled is located;
if the target time domain symbol position information is of the second type, the relative position parameter is used for indicating a relative position between the starting time domain symbol occupied by the channel to be scheduled and the time domain resources where the target control information is located.

3. The method according to claim 2, wherein if the target time domain symbol position information is of the second type,
the relative position parameter is used for indicating a relative position between the starting time domain symbol occupied by the channel to be scheduled and a starting time domain symbol or an ending time domain symbol of a control resource set or search space where the target control information is located.

4. The method according to claim 2, wherein the target time domain symbol position information comprises a length parameter, wherein the length parameter is used for indicating a length of the time domain resources occupied by the channel to be scheduled.

5. The method according to claim 2, wherein the resource configuration message comprises at least one time slot-level offset parameter corresponding to the at least one time domain symbol position information, and the target time domain symbol position information corresponds to a target time slot-level offset parameter,
the determining, by the terminal device, the type of the target time domain symbol position information, comprises:
determining, by the terminal device, the type of the target time domain symbol position information according to the target time slot-level offset parameter.

6. The method according to claim 5, wherein the determining, by the terminal device, the type of the target time domain symbol position information according to the target time slot-level offset parameter, comprises:
determining, by the terminal device, the type of the target time domain symbol position information as the first type if the target time slot-level offset parameter is not equal to 0; or
determining, by the terminal device, the type of the target time domain symbol position information as the second type if the target time slot-level offset parameter is equal to 0.

7. The method according to claim 1, wherein the channel to be scheduled is any one of physical uplink control Channel (PUCCH), physical downlink control channel (PDCCH), physical uplink shared channel (PUSCH) and physical downlink shared channel (PDSCH).

8. The method according to claim 1, wherein the resource configuration message is radio resource control (RRC) signaling or system information.

9. The method according to claim 1, wherein the target control information is downlink control information (DCI) for scheduling the channel to be scheduled.

10. A method for transmitting channels, comprising:
transmitting, by a network device, a resource configuration message to a terminal device, wherein the resource configuration message comprises at least one time domain symbol position information, the at least one time domain symbol position information is used for indicating positions of a starting time domain symbol occupied by a channel to be scheduled of the terminal device, a type of the at least one time domain symbol position information is a first type or a second type, wherein time domain symbol position information for the first type is used for indicating a relative position between the starting time domain symbol occupied by the channel to be scheduled and a time slot where the channel to be scheduled is located, and time domain symbol position information for the second type is used for indicating a relative position between the starting time domain symbol occupied by the channel to be scheduled and time domain resources where target control information is located;

transmitting, by the network device, the target control information to the terminal device, wherein the target control information is used for the terminal device to determine target time domain symbol position information;

transmitting, by the network device, the channel to be scheduled with the terminal device according to a position of the starting time domain symbol occupied by the channel to be scheduled and indicated by the target control information.

11. The method according to claim 10, wherein the target time domain symbol position information comprises a relative position parameter, if the target time domain symbol position information is of the first type, the relative position parameter is used for indicating a relative position between the starting time domain symbol occupied by the channel to be scheduled and a starting time domain symbol of the time slot where the channel to be scheduled is located;

if the target time domain symbol position information is of the second type, the relative position parameter is used for indicating a relative position between the starting time domain symbol occupied by the channel to be scheduled and the time domain resources where the target control information is located.

12. The method according to claim 11, wherein if the target time domain symbol position information is of the second type, the relative position parameter is used for indicating a relative position between the starting time domain symbol occupied by the channel to be scheduled and a starting dine domain symbol or an ending time domain symbol of a control resource set or search space where the target control information is located.

13. The method according to claim 11, wherein the target time domain symbol position information comprises a length parameter, wherein the length parameter indicates a length of the time domain resources occupied by the channel to be scheduled.

14. The method according to claim 11, wherein the resource configuration message comprises at least one time slot-level offset parameter corresponding to the at least one time domain symbol position information, the target time domain symbol position information corresponds to a target time slot-level offset parameter, and the target time slot-level offset parameter is used for indicating a type of the target time domain symbol position information.

15. The method according to claim 14, wherein the type of the target time domain symbol position information is the first type if the target time slot-level offset parameter is not equal to 0; or the type of the target time domain symbol position information is the second type if the target time slot-level offset parameter is less than or equal to a preset value.

16. The method according to claim 10, wherein the channel to be scheduled is any one of physical uplink control channel (PUCCH), physical downlink control channel (PDCCH), physical uplink shared channel (PUSCH) and physical downlink shared channel (PDSCH).

17. The method according to claim 10, wherein the resource configuration message is radio resource control (RRC) signaling or system information.

18. The method according to claim 10, wherein the target control information is downlink control information (DCI) for scheduling the channel to be scheduled.

19. A terminal device, comprising a processor, a transceiver and a memory, wherein the memory is configured to store instructions, and the processor is configured to execute the instructions stored in the memory to:

control the transceiver to receive a resource configuration message, wherein the resource configuration message comprises at least one time domain symbol position information, the at least one time domain symbol position information is used for indicating positions of a starting time domain symbol occupied by a channel to be scheduled, and a type of the at least one time domain symbol position information is a first type or a second type, wherein time domain symbol position information for the first type is used for indicating a relative position between the starting time domain symbol occupied by the channel to be scheduled and a time slot where the channel to be scheduled is located, and time domain symbol position information tor the second type is used for indicating a relative position between the starting time domain symbol occupied by the channel to be scheduled and time domain resources where tartlet control information is located;

determine based on the target control information a type of target time domain symbol position information;

determine, according to the type of the target time domain symbol position information, that a position of the starting time domain symbol occupied by the channel to be scheduled is a target position, wherein the position of the starting time domain symbol occupied by the channel to be scheduled is indicated by the target time domain symbol position information.

20. The terminal device according, to claim 19, wherein the target time domain symbol position information comprises a relative position parameter, if the target time domain symbol position information is of the first type, the relative position parameter is used for indicating a relative position between the starting time domain symbol occupied by the channel to be scheduled and a starting time domain symbol of the time slot where the channel to be scheduled is located;

if the target time domain symbol position information is of the second type, the relative position parameter is used for indicating a relative position between the starting time domain symbol occupied by the channel to be scheduled and the time domain resources where the target control information is located.

21. The terminal device according to claim 20, wherein if the target time domain symbol position information is of the second type, the relative position parameter is used for indicating a relative position between the starting time domain symbol occupied by the channel to be scheduled and a starting time domain symbol or an ending time domain symbol of a control resource set or search space where the target control information is located.

22. The terminal device according to claim 20, wherein the target time domain symbol position information comprises a length parameter, wherein the length parameter indicates a length of the time domain resources occupied by the channel to be scheduled.

23. The terminal device according to claim 20, wherein the resource configuration message composes at least one time slot-level offset parameter corresponding to the at least one time domain symbol position information, and the target time domain symbol position information corresponds to a target time slot-level offset parameter,
the processor is further configured to execute the instructions stored in the memory to:
determine the type of the target time domain symbol position information according to the target time slot-level offset parameter.

24. The terminal device according to claim 23, wherein the processor is further configured to execute the instructions stored in the memory to:
determine the type of the target time domain symbol position information as the first type if the target time slot-level offset parameter is not equal to 0; or
determine the type of the target time domain symbol position information as the second type if the target time slot-level offset parameter is equal to 0.

25. The terminal device according to claim 19, wherein the channel to be scheduled is any one of physical uplink control channel (PUCCH), physical downlink control channel (PDCCH), physical uplink shared channel (PUSCH) and physical downlink shared channel (PDSCH).

26. The terminal device according to claim 19, wherein the resource configuration message is radio resource control (RRC) signaling or system information.

27. The terminal device according to claim 19, wherein the target control information is downlink control information (DCI) for scheduling the channel to be scheduled.

28. A network device, comprising a processor, a transceiver and a memory, wherein the memory is configured to store instructions, and the processor is configured to execute the instructions stored in the memory to control the transceiver to:
transmit a resource configuration message to a terminal device, wherein the resource configuration message comprises at least one time domain symbol position information, the at least one time domain symbol position information is used for indicating positions of a starting time domain symbol occupied by a channel to be scheduled of the terminal device, a type of the at least one time domain symbol position information is a first type or a second type, wherein time domain symbol position information for the first type is used for indicating a relative position between the starting time domain symbol occupied by the channel to be scheduled and a time slot where the channel to be scheduled is located, and time domain symbol position information for the second type is used for indicating a relative position between the starting time domain symbol occupied by the channel to be scheduled and time domain resources where target control information is located;
transmit the target control information to the terminal device, wherein the target control information is used for the terminal device to determine target time domain symbol position information;
transmit the channel to be scheduled with the terminal device according to a position of the starting time domain symbol occupied by the channel to be scheduled and indicated by the target control information.

29. The network device according to claim 28, wherein the target time domain symbol position information comprises a relative position parameter,
if the target time domain symbol position information is of the first type, the relative position parameter is used for indicating a relative position between the starting time domain symbol occupied by the channel to be scheduled and a starting time domain symbol of the time slot where the channel to be scheduled is located;
if the target time domain symbol position information is of the second type, the relative position parameter is used for indicating a relative position between the starting time domain symbol occupied by the channel to be scheduled and the time domain resources where the target control information is located.

30. The network device according to claim 29, wherein if the target: time domain symbol position information is of the second type,
the relative position parameter is used for indicating a relative position between the starting time domain symbol occupied by the channel to be scheduled and a starting time domain symbol or an ending time domain symbol of a control resource set or search space where the target control information is located.

31. The network device according to claim 29, wherein the target time domain symbol position information comprises a length parameter, wherein the length parameter indicates a length of the time domain resources occupied by the channel to be scheduled.

32. The network device according to claim 29, wherein the resource configuration message comprises at least one time slot-level offset parameter corresponding to the at least one time domain symbol position information, the target time domain symbol position information corresponds to a target time slot-level offset parameter, and the target time slot-level offset parameter is used for indicating a type of the target time domain symbol position information.

33. The network device according to claim 32, wherein the type of the target time domain symbol position information is the first type if the target time slot-level offset parameter is not equal to 0; or
the type of the target time domain symbol position information is the second type if the target time slot-level offset parameter is less than or equal to a preset value.

34. The network device according to claim 28, wherein the channel to be scheduled is any one of physical uplink control channel (PUCCH), physical downlink control channel (PDCCH), physical uplink shared channel (PUSCH) and physical downlink shared channel (PDSCH).

35. The network device according to claim 28, wherein the resource configuration message is radio resource control (RRC) signaling or system information.

36. The network device according to claim 28, wherein the target control information is downlink control information (DCI) for scheduling the channel to be scheduled.

* * * * *